United States Patent
Lesage et al.

(10) Patent No.: US 10,285,036 B2
(45) Date of Patent: *May 7, 2019

(54) EMERGENCY INFORMATION DELIVERY

(71) Applicant: Comcast Cable Communications, LLC, Philadelphia, PA (US)

(72) Inventors: William Lesage, Englewood, CO (US); Thiru Srinivasan, Highlands Ranch, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/847,160

(22) Filed: Dec. 19, 2017

(65) Prior Publication Data

US 2018/0338236 A1 Nov. 22, 2018

Related U.S. Application Data

(63) Continuation of application No. 14/244,300, filed on Apr. 3, 2014, now Pat. No. 9,877,177.

(51) Int. Cl.
*H04W 4/90* (2018.01)
*G08B 25/00* (2006.01)

(52) U.S. Cl.
CPC ............ *H04W 4/90* (2018.02); *G08B 25/006* (2013.01)

(58) Field of Classification Search
CPC ....... H04W 4/22; H04W 4/06; H04W 76/007; H04W 4/02; H04W 12/06; H04W 4/008; H04W 4/025; H04M 2242/04; H04M 3/5116; H04M 1/72538; H04M 1/72572; H04M 2250/02; H04M 1/72533; H04M 3/42068; H04M 3/42357

See application file for complete search history.

(56) References Cited

U.S. PATENT DOCUMENTS

| 9,578,620 B2 | 2/2017 | Krening et al. |
| 9,877,177 B2* | 1/2018 | Lesage ..................... H04W 4/90 |
| 2003/0012344 A1* | 1/2003 | Agarwal ................ H04M 11/04 379/37 |
| 2006/0075075 A1* | 4/2006 | Malinen ............ H04M 1/72572 709/220 |
| 2009/0055229 A1* | 2/2009 | Lidgren ........... G06Q 10/06311 705/7.13 |

(Continued)

*Primary Examiner* — Magdi Elhag
(74) *Attorney, Agent, or Firm* — Banner & Witcoff, Ltd.

(57) ABSTRACT

Various systems described herein may allow a user's personal information, such as their medical history, to be automatically delivered to appropriate emergency personnel in response to a reported emergency, such as a 911 call, activation of a smoke alarm or security system, or other emergency. Various items of personal and confidential information may be stored in a secure location, and the user may provide advanced approval to have the information automatically delivered to emergency responders in response to a request for emergency assistance. For example, after the user initiates a request for emergency assistance, a computing device may determine whether the user has granted approval for emergency delivery of the user's confidential information, and if such approval has been granted, the computing device may request the delivery of the user's confidential information to the emergency responders.

20 Claims, 6 Drawing Sheets

(56) References Cited

U.S. PATENT DOCUMENTS

| | | | | |
|---|---|---|---|---|
| 2009/0186596 A1* | 7/2009 | Kaltsukis | ............... | G08B 25/08 |
| | | | | 455/404.2 |
| 2012/0088466 A1* | 4/2012 | Conroy | ................ | G06F 19/322 |
| | | | | 455/404.1 |
| 2012/0258680 A1* | 10/2012 | Piett | ........................ | H04W 4/90 |
| | | | | 455/404.1 |
| 2013/0149962 A1* | 6/2013 | Kim | ..................... | H04B 5/0025 |
| | | | | 455/41.1 |
| 2013/0204513 A1* | 8/2013 | Pandy | ..................... | F02D 28/00 |
| | | | | 701/114 |
| 2015/0195676 A1* | 7/2015 | Endress | .................. | H04W 4/90 |
| | | | | 455/404.2 |
| 2015/0304983 A1* | 10/2015 | Krening | .............. | H04W 64/003 |
| | | | | 370/254 |
| 2016/0183311 A1* | 6/2016 | Mitchell, Jr. | ........... | H04W 4/90 |
| | | | | 455/404.2 |

* cited by examiner

400a

Information for Emergency Responders

Number of People Living in House: 4

First Person:

| Name: | William |
|---|---|
| Age: | 35 |
| Appox. Weight: | 165 lbs. |
| Blood Type: | O+ |
| Hearing Impaired? | No |
| Mobility Impaired? | No |
| Bedroom Level: | 2nd Floor |

Information for Emergency Responders

| | Fire | Police | Medical |
|---|---|---|---|
| Names: | ✓ | ✓ | ✓ |
| Personal Info: | | ✓ | ✓ |
| Medical Histories: | | | ✓ |
| Home Layout/Exits: | ✓ | ✓ | |
| Weapons / Pets: | | ✓ | |

Fig. 4B

EMERGENCY INFORMATION DELIVERY

CROSS REFERENCE TO RELATED APPLICATIONS

This application is a continuation of U.S. patent application Ser. No. 14/244,300, filed Apr. 3, 2014, entitled "EMERGENCY INFORMATION DELIVERY," which is incorporated herein by reference.

BACKGROUND

Time is precious in an emergency situation, and valuable time can be lost due to inadequate information being supplied to emergency responders. For example, firefighters responding to a smoke alarm might not be informed of the number of occupants in the home until it is too late. Medical personnel may arrive at a home unaware of a victim's medical history. There remains an ever-present need for greater levels of communication in emergency situations, but in a manner that does not unduly compromise privacy.

SUMMARY

The following summary is for illustrative purposes only, and is not intended to limit or constrain the detailed description.

Features described herein relate generally to a system in which a user's personal information, such as their medical history, may be automatically delivered to the appropriate emergency personnel in response to the emergency call for help. In some embodiments, various items of personal and confidential information may be stored in a secure location, and the user may provide advanced approval to have some or all of the information automatically delivered to emergency responders in response to a request for or during emergency assistance. When the user subsequently initiates a request for emergency assistance, a computing device may determine whether the user has granted approval for emergency delivery of the user's confidential information, and if he/she has granted such approval, the computing device may request or perform the delivery of the user's confidential information to the emergency service or the responder(s).

In some embodiments, the user's confidential information may be stored in a secure storage device, which may be separate and apart from the computing device that initially handles the emergency call for help.

In some embodiments, the user may associate different subsets of the user's confidential information with different types of emergencies. For example, the user's identification and medical history may be relevant to medical personnel (e.g., paramedics, caretakers, person with power of attorney for a resident, etc.) responding to medical emergencies, but not for security-type emergencies, e.g., caused by a burglar breaking a window. Law enforcement personnel (e.g., police officers) responding to a burglary alarm may need to know whether there are firearms and dogs in the premises, and fire personnel may need to know the number of occupants in the premises and whether any of them are mobility impaired. The user may provide all of this confidential information to one or more components of a system described herein, and may designate different portions of the information as being relevant to different corresponding types of emergencies.

In some embodiments, the user may wish to tightly control the dissemination of the user's confidential information through the use of one or more networks at the user's premises. The user may, for example, store the confidential information in a storage accessible to a wireless network, and may only provide the emergency responder with network credentials for logging in to the wireless network. When the emergency personnel arrive at the premises, the emergency personnel may carry a computing device that can login to the wireless network (when in range) and request the confidential information. By limiting access to those who connect to the wireless network, the user can be assured that the information will not be transmitted over long distances and reduce the risk of being intercepted and compromised.

In some embodiments, the user may configure one or more networks (e.g., wired or wireless networks) and/or different service identifiers, corresponding to different types of emergency personnel and/or different types of emergencies. For example, a single emergency-related network may be established for communication with all types of emergency personnel. In other examples, one wireless network may be established for law enforcement personnel, another for firefighters, and another for medical personnel, etc. Different login credentials may be provided to these different emergency responders, and they may each login when they arrive on site and retrieve the confidential information relevant to their respective duties. In any of these examples, the emergency-related network(s) may be different from one used by the user for ordinary, non-emergency use. In some embodiments, the login credentials and/or emergency networks need not even exist until a call for assistance is made. For example, one or more sets of login credentials for emergency networks, and/or the emergency networks themselves, may be automatically established in response to a request for emergency assistance. Furthermore, the login credentials for the various networks may be automatically expired upon the passage of a predetermined amount of time (e.g., time since the alarm is received, time since the credentials are supplied to emergency personnel, time since emergency personnel first log in to retrieve the confidential information, etc.).

In some embodiments, the automatic delivery of emergency information may be triggered in response to an emergency phone call (e.g., 911) or an alarm. In other embodiments, different subsets of information may be automatically delivered in response to other types of communications, such as calls to different numbers, activations of security systems or fire detection systems, text or other messages to certain emergency numbers, emails to certain emergency addresses, etc.

In some embodiments, the confidential information may be obtained from another computing device of the user, such as a smartphone of the user, instead of another device on the user's network. In such embodiments, the emergency personnel may simply connect directly with the user's smartphone instead of a wireless access point, for example, to obtain the confidential information. The connection may be made using any desired connection type, including wireless near-field communications (NFC), in which case the emergency personnel may initially be provided with a password to establish an NFC connection with the user's smartphone.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings.

The present disclosure is illustrated by way of example, and not limited by, the accompanying figures in which like numerals indicate similar elements.

FIGS. 4A and 4B are examples of user interfaces in accordance with various features described herein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
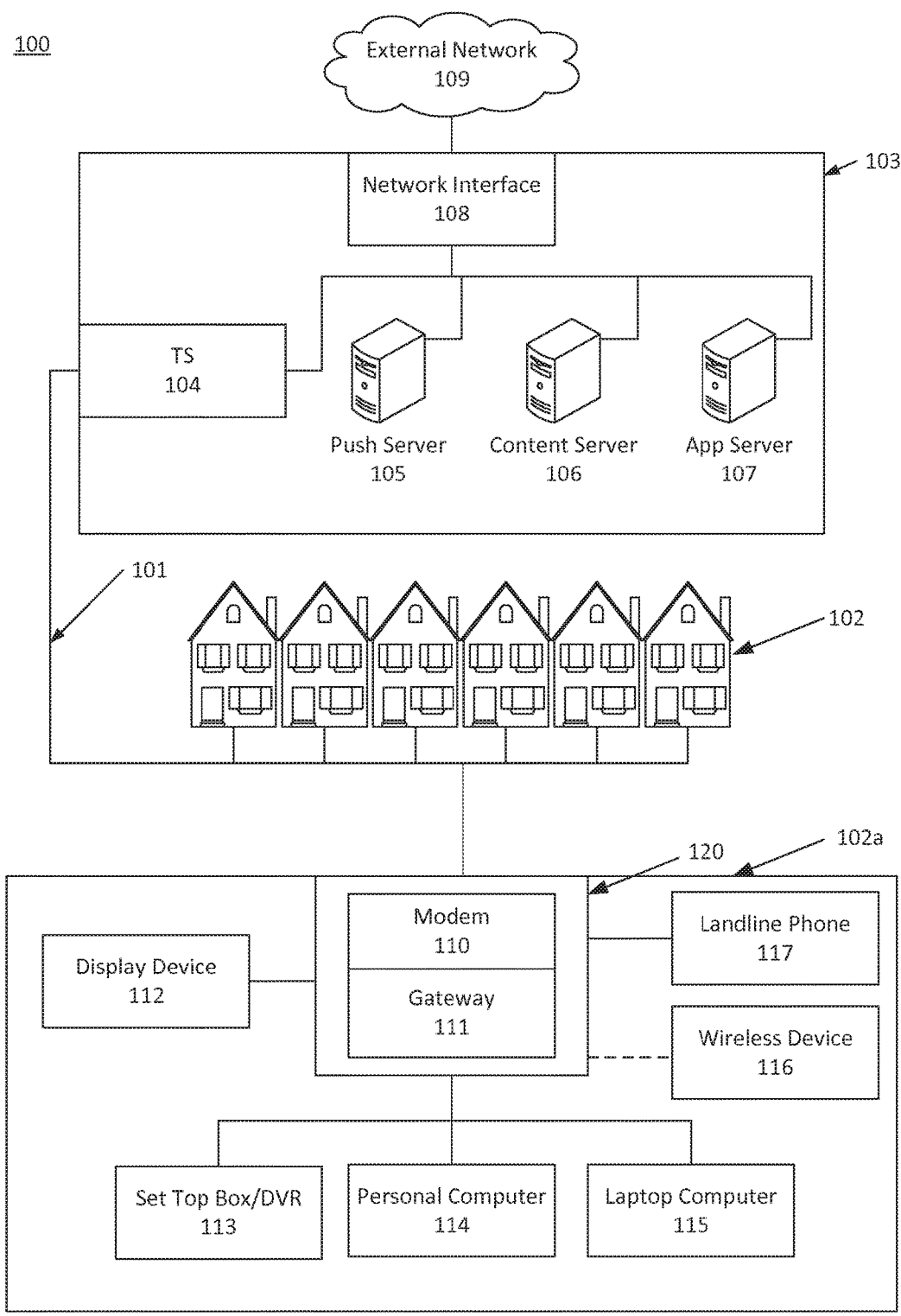
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local WiFi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
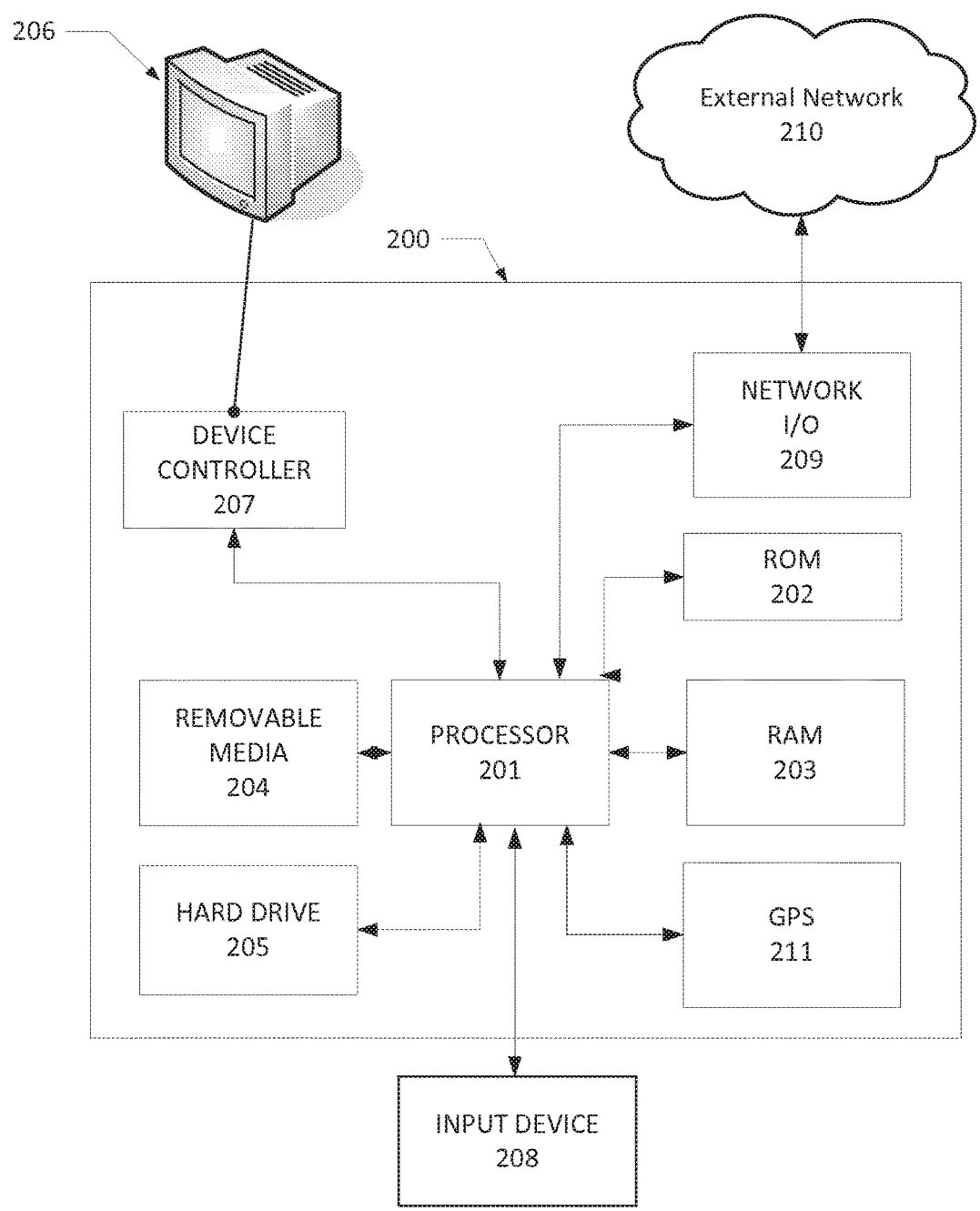
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

Although the example shown in FIG. 2 is a hardware configuration, the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
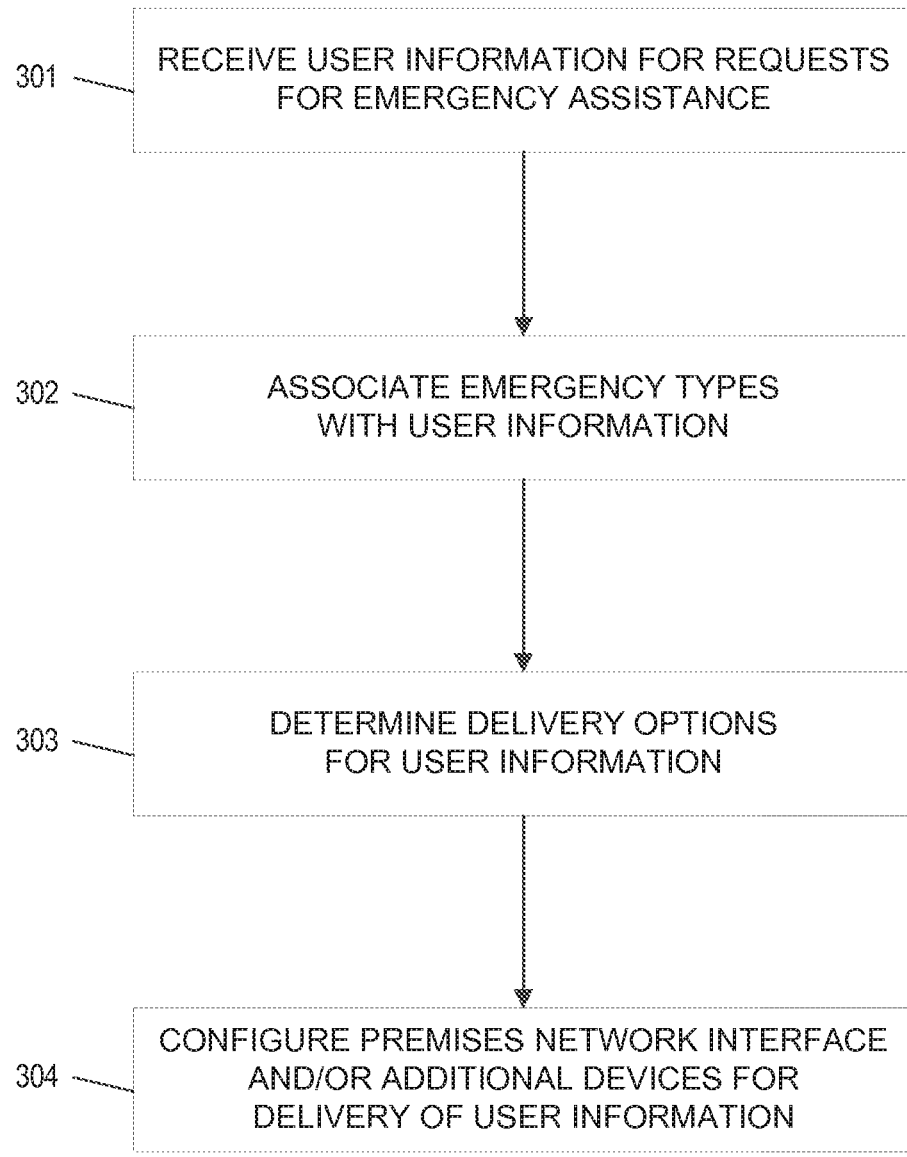
FIG. 3 illustrates an example process for implementing various features described herein.

FIG. 3 is a flow diagram illustrating an example process of collecting user information and configuring the delivery of the user information to one or more emergency responders in the event of an emergency. The steps, features, and examples discussed in connection with FIG. 3 may be performed by one or more computing devices in a communication system, such as communication network 100. As discussed below, FIG. 3 relates to collecting and storing information relating to users, and configuring various computing devices so that the user information may be provided to emergency responders in the event of an emergency. In some examples, the steps and features of FIG. 3 may be performed by one or more devices entirely within a user's premises 102a, such as the user's personal computer 114, wireless device 116 (e.g., mobile phone or tablet computer), and/or gateway 111. For instance, a user may input various data, such as confidential data, via a set top box 113, personal computer 114, laptop computer 115, or wireless device 116, and the data may be securely stored locally at the user's premises 102a, either within the same device used to input the data, or within another secure device (e.g., personal computer 114, gateway 111, etc.). In other examples, the steps and features of FIG. 3 may be performed by a combination of devices inside and outside of a user's premises 102. For instance, a user may input confidential information via a set top box 113, personal computer 114, laptop computer 115, and/or wireless device 116, after which the user's confidential information may be securely transmitted to one or more external servers maintained by emergency responders (e.g., service providers, local governments, fire departments, police departments, emergency response medical organizations, etc.), a local office 103 of a network provider, and/or secure servers maintained at a remote third-party storage provider. Regardless of whether the user's confidential data is stored in one or more devices on the user's premises 102a, or whether it is stored securely by computing devices away from the user's premises, the devices storing the user's information (and/or additional computing devices and system) may be configured to identify reported emergency situations affecting the user and deliver the user's information to the emergency response personnel responding the user's emergency situation.

In step 301, the user's information, which may contain in whole or in part confidential information, is received and stored at one or more computing devices 200 in a communication network 100. The confidential information received in step 301 may include any information relating to one or more users and/or the users' home that may be potentially relevant to emergency response personnel. In various types of emergencies, it may be useful for firefighters, law enforcement officers, paramedics, and/or other responders dispatched to an emergency location to have information about the people present at the emergency location, the building layout and characteristics at the emergency location, and other relevant data relating to the emergency location. For instance, it may be useful to emergency responders to know the number of people residing at (and/or temporarily staying at) a house or building to which they have been dispatched, along with the names, ages, heights and weights, and other physical characteristics of the individuals. Additionally, it may be useful for law enforcement officers responding to an emergency to be aware of the criminal histories, the outstanding arrest warrants, the concealed carry permits, the military backgrounds or other relevant weapons or combat training of any individuals at the location. It may be useful to paramedics and other emergency medical responders to have access to the existing medical conditions (e.g., disabilities, diseases, allergies, etc.) and medical histories (e.g., past diseases and conditions, results of previous physicals and other medical tests, etc.) for the individuals at the location.

In addition to information about the individuals residing at (or temporarily staying at) a residence or other emergency location, the information received in step 301 may include information about the buildings or structures at or near the emergency location, along with other relevant information about the location or neighborhood. For example, it may be useful for emergency responders dispatched to a house or apartment building to have information about the layout of the house or apartment building, including the numbers and locations of occupied bedrooms, and the number and locations of possible entry and exit points (e.g., external doors, windows, fire escapes, roof access, etc.). Additional information relevant to emergency responders may include potential threats at the emergency location, such as dogs and other pets, firearms on the premises, or explosive or combustible objects (e.g., propane tanks or woodpiles) at or near the emergency location. Safety features of a building or home, such as the presence of first aid kits, defibrillators, sprinkler systems, fire extinguishers, gas shut off valves, etc., also may be useful to emergency responders in various emergency situations.

Any of the user information in the above examples, as well as any other information that may potentially be used by emergency responders, may be received in step 301 from users or other data sources. In some embodiments, a user interface may be provided to a user, e.g., as part of a web-based application or standalone software application, to allow the user to directly input various confidential and non-confidential information. Such user interfaces may include text boxes, menus, dropdowns, and other user interface components configures to request and receive different types of user information.

Referring now to FIG. 4A, an example user interface is shown for collecting user and household information. In this example, a display screen 400a is shown with user interface components allowing a user to input the number of people living in the user's house, along with various information about each member of the household (e.g., name, age, physical characteristics, medical information, disabilities, and where the person sleeps in the house). In this example, the user interface 400a may be presented to the user via a home computing device, such as a set top box 113 or personal computer 114, or via a mobile device 116 (e.g., smartphone, tablet computer, etc.). The user interface may be provided as part of web-based software application or other client-server application, or as part of standalone software application installed on the computing device. In some cases, a local office server (e.g., 105, 106, or 107), third-party application server, or the gateway device 111 on the user's premises may be configured to provide a user interface to a client computing device to collect the information from the user in step 301. Thus, the information input by the user into the user interface 400a may be transmitted to another device, such as the user's gateway device 111, a remote content server 106, or other remote storage device within or outside of the user's premises 102a.

In certain embodiments, the user information received in step 301 may be retrieved from one or more external data sources, instead of or in addition to receiving user information input via a user interface. For example, a user's medical information and medical history may be retrieved from a database maintained by the user's doctor or other health care provider. In such examples, rather than manually inputting their medical information via a user interface, users may provide authorization for their medical information to be retrieved from an external medical data source. Similarly, information about various users' criminal histories, gun permits, pets or registered firearms, and other user data may be retrieved from various external data sources (e.g., police record databases, state gun registration databases, etc.) rather than this data being input manually by the user. Information received in step 301 relating to the user's home or premises 102a also may be retrieved from external data sources, instead of or addition to being received directly from the user. For example, building layout data, structure entry and exit data, and records regarding the numbers and ages of occupants may be retrieved from local, state, or federal government databases, building records and zoning databases, and other such data sources.

Thus, some or all of the data received in step 301 may be retrieved and stored automatically by one or more storage devices and/or software applications, rather than being received as user input via a user interface. As noted above, for confidential user information such as medical histories, criminal records, and the like, explicit authorization by the user may be required before the confidential information may be retrieved. In some cases, a user interface may be provided via a computing device on the premises (e.g., 113-115) or the user's mobile device 116, allowing the user to grant or deny authorization to retrieve the user's confidential information from various external data sources. If the user grants authorization to retrieve certain confidential data (e.g., medical records, gun registration records, etc.), the user may be prompted via a user interface to provide necessary information for the system to retrieve the data from an external data source (e.g., health care provider, account number, username and password for an online website, etc.). If the user does not grant authorization for the emergency information delivery system to retrieve confidential data from external data sources, the user's denial may initiate a user interface (e.g., 400a) to allow the user the option to manually input the confidential data.

In step 302, additional data is received or generated to associate the user information received in step 301 with one or more types of emergencies and/or types of emergency responders. As discussed above, certain user information may be helpful to certain types of emergency responders in various situations, but might not be helpful to other types of emergency responders in other situations. For instance, the names, ages, blood types, medical histories, and living will information for family members living at a premises 102a may be useful for medical personnel (e.g., paramedics, caretakers, person with power of attorney for a resident, etc.) responding to a medical emergency at the premises, but would not be helpful for law enforcement officers responding to a break-in at the premises when the family was on vacation.

In some embodiments, the user may expressly determine which emergency responders may receive which specific pieces of information about the user, the user's family (and/or roommates), and the user's home. Referring now to FIG. 4B, an example user interface is shown allowing the user to designate specific types of user information for delivery to different classifications of emergency responders. In this example, the user's information is classified into the several categories, including family names, personal information, medical histories, the layout of the user's home and the entry/exit points, and any weapons or pets at the user's home. In the display screen 400b, the user may use clickable checkboxes to designate or de-designate each category of user information for a specific type of emergency responders (e.g., firefighters, law enforcement officers, paramedics, etc.).

As mentioned above, the example user interface shown in FIG. 4B divides the user's information into the five different categories. However, in other examples, user interfaces may use different numbers or information types/categories for grouping and displaying the user's confidential and non-confidential information. In some cases, the user interface may allow the user to define to the categories that group the user's information. Grouping of user information into categories may be optional and need not be performed in some cases, in which case the user may have complete control to designate or de-designate each individual piece of user information.

The example user interface shown in FIG. 4B designates user information to be provided to different types of emergency responders, such as firefighters, law enforcement personnel (e.g., police officers), and paramedics. However, in other embodiments, the user interface may designate user information to be provided based on the type of the emergency situation rather than the type of the emergency responder. For example, both firefighters and paramedics may be dispatched in response to a fire, and the user may want both types of responders to be provided the same relevant information in this situation. As another example, a user may wish to provide law enforcement officers responding to a reported break-in different information, depending on whether the user's family is home or away at the time of the reported break-in. Thus, in some embodiments, the user interface may allow the user to designate different categories or pieces of information to provide to emergency responders, based on the emergency type (e.g., smoke alarm or fire detection system activated, fire reported by user, gas leak, flooding, break-in/disturbance reported by neighbor, break-in/intruder reported by user, security system or burglar alarm activated, medical emergency affecting user, medical emergency affecting user's spouse, medical emergency affecting user's children, etc.), rather than based on the type of emergency responder.

In still other cases, the user may designate different categories or pieces of information to provide to emergency responders based on a combination of the type of the emergency responder (e.g., firefighter, law enforcement officer, paramedic, etc.) and the type of the emergency situation. For example, paramedics responding to a fire may be provided with a first set of user information, while firefighters responding to the same fire may be provided with a different second set of user information, while firefighters responding to reports of a gas leak in the home (but no fire) or other emergency may be provided with a third set of user information different from either of the first and second sets of information.

In some cases, step 302 may be optional or may be performed automatically by the software of one or more of the computing devices described herein. For instance, different categories of user information may be pre-designated for different types of emergency responders and/or different emergency situations based on a determination of the types of information that are most likely to be useful to emergency responders in different situations. In some cases, users may authorize emergency responders to designate which types of information they will receive in different emergency situations. In such cases, a simplified version of the user interface in FIG. 4B may be transmitted to an emergency responder in a certain locality or region. Users may be permitted to override and change any default designations or designations set by emergency responders, if the user does not want certain confidential information shared.

In step 303, one or more options are determined for providing the user's information to the emergency responders in the event of an emergency reported by or affecting the user. As discussed below in more detail, the configurable options for providing the user's information to emergency responders may include when and how different emergency responders will be provided with the user's information. In some cases, the user's information may be transmitted directly to emergency services dispatchers and/or directly to emergency responders on-route to the emergency location. In other cases, the emergency responders might not receive the user's information, but instead may receive a set of access credentials, such as network credentials to access a wireless network at the user's premises, near-field communication (NFC) information and access credentials, and/or Bluetooth information and access credentials. In these cases, the emergency responders may use the access credentials when they arrive at the emergency location (e.g., the user's premises 102a) to access one or more secure computing devices at the emergency location (e.g., devices 111, 113, 114, 115, and/or 116) and retrieve the user's information from the secure devices on the user's premises 102a. Some users may prefer that their actual user information be transmitted to on-route emergency responders, for example, to allow the emergency responders to review the information and prepare a strategy for handling the emergency situation before arriving at the user's premises 102a. However, other users may want greater protection of their privacy and may decide to limit the transmission of their confidential information to their secure home communication network, in which case they may prefer to transmit only access credentials and related information to the on-route emergency responders, rather than the user's actual confidential information.

Additional configurable options for providing the user's information to emergency responders may include where the user's information is to be stored and how the user's information is to be transmitted to emergency responders. In some examples, confidential user information may be stored in one or more secure devices on the user's premises 102a, such as the user's gateway 111, set top box 112, and/or personal computer 113. Additionally, or as an alternative storage option, a user's confidential information may be stored in a secure computing device remote from the user's premises 102a, such as an application server 107 at a local office 103 of a network provider, a secure database of an emergency responder (e.g., a police or fire department server, an emergency dispatch server, etc.), and/or a third-party secure data storage provider. It may be desirable in some cases to store to the user's information at a secure remote location, instead of or in addition to computing devices at the user's premises 102a, for example, in the event of a fire, flood, power outage, or other emergency circumstances that may affect the user's computing devices. However, other users may prefer to store their confidential information only on secure computing devices within their home.

In some embodiments, it may be a user-configurable option to store some or all of the user's information in one or more wireless devices 116, such as the user's mobile phone or tablet computer. For example, some users may elect to store only non-confidential information on their mobile devices 116, while other users may elect to store both confidential and non-confidential information in a secure memory on their mobile devices 116. Some users may elect to store information such as existing medical conditions and medical histories on their mobile device 116, so that emergency responders can retrieve this information from the user's mobile device 116 even if an emergency situation does not occur at the user's home 102a.

Other configurable options in various embodiments may include which secure networks and security protocols are to be used to transmit the user's information and/or access credentials to the emergency responders, the expiration conditions of wireless access credentials (e.g., expiration time or number of access attempts), and the like.

In some cases, determining the options for providing the user's information to the emergency responders in step 303 may include receiving user input selecting and configuring various information delivery options via a user interface. For example, the examples user interfaces shown in FIGS. 4A and 4B may include additional menus, options, and components to allow the user to select the information delivery conditions (e.g., delivery of user information or wireless network credentials to on-route emergency responders), storage options (e.g., storage only on local gateway 111, storage on local personal computer 114, duplicate storage on mobile device 116, backup storage on external system, etc.).

In various different embodiments, users may have greater or fewer choices for configuring the delivery of information to emergency responders, depending on the hardware and software architecture of the user's communication network 100, and the capabilities of the various user devices 200 within the network. For instance, some premises 102a may include a network interface 120 capable of automatically creating new sets of wireless network access credentials, or creating new temporary wireless networks on the fly, in which case a user may have an option to provide emergency responders with temporary wireless network credentials to the user's primary network, or with credentials to a temporary wireless network rather than to the user's primary wireless network. Temporary wireless networks may be created specifically for use by emergency responders, and in some cases may be created in response to the identification of the reported emergency (e.g., the initiation of 911 call from the user's premises, the activation of a security system alarm or smoke detector at the user's premises, etc.). In some cases, multiple temporary wireless network passwords, and/or temporary wireless networks may be created corresponding different types of emergencies or different types of emergency responders. For instance, a first temporary wireless network password (or temporary wireless network) may be created and stored for law enforcement officers, a second for firefighters, a third for paramedics, and so on. Similarly, additional user options such as enabling access to the user information via NFC or Bluetooth communication with certain user devices (e.g., a mobile device 116) may be available when the user's network architecture 100 and various devices 200 support such capabilities.

In step 304, one or more computing devices in the communication network 100 may be configured to deliver user information to emergency responders. As discussed above, the user information delivered to emergency responders in the event of an emergency may include the actual confidential and non-confidential data that describes the user, the user's home, and the user's family, roommates, etc. In other cases, the user information delivered might only include one or more sets of network credentials, such as the name and password to a network containing the emergency-related information to allow the emergency responders to access and retrieve the user's confidential and non-confidential data from a secure device on the user's premises 102a after arriving at the emergency location. The configuration of computing devices in step 304 may be based on the specific user information received in step 301, the associated emergency types identified in step 302, and the delivery options determined in step 303. For example, one or more devices within a user's premises 102a and/or various external devices may be configured to store confidential and/or non-confidential user information, store data associating specific user information to types of emergencies and/or emergency responders, and to retrieve and transmit the appropriate user information in response to a reported emergency affecting the user or the user's premises 102a.

In some embodiments, one or more network interface devices at the user's premises, such as modem 110 or gateway 111, may be configured to store and transmit the user information to emergency responders in the event of an emergency. For example, a modem 110 and/or gateway device 111 with an integrated wireless access point (e.g., a WiFi router) may be configured to store the user's information in a secure memory of the device, and then to transmit the user's information to one or more emergency responders via communication network 100 in the event of an emergency. Additional devices at the user's premises 102a, such as a set top box 113 or personal computer 114 also may be configured to store and/or transmit the user information to emergency responders via communication network 100. Additionally or alternatively, one or more of the user's mobile devices 116 (e.g., smartphones, tablet computers) may be configured to store and/or transmit the user information to emergency responders via a separate wireless network. The destination network addresses for emergency providers (e.g., police, fire, and/or paramedic dispatch office servers) may be received from a repository of emergency provider addresses or may be preconfigured into the user's computing devices by a network provider to allow the user's devices to determine the proper destination address for delivery of the user's information during an emergency.

In some cases, one or more network interface devices 120 also may be configured to create or activate a new set of user credentials, or a new wireless network, to be used by emergency responders. For example, if a modem 110 or gateway device 111 (or other device) is configured to only provide network access credentials to on-route emergency responders (rather than the user information itself), the modem 110 or gateway 111 may also be configured to create a separate set of network credentials and/or a separate wireless network (e.g., with a new SSID) to be accessed by the emergency responders. In such examples, the user's private networks and/or private access credentials may remain confidential, and the modem 110 or gateway may be further configured to deactivate or remove any new sets of network credentials and/or new wireless networks created for emergency responders, after the emergency is over.

Figure 5:
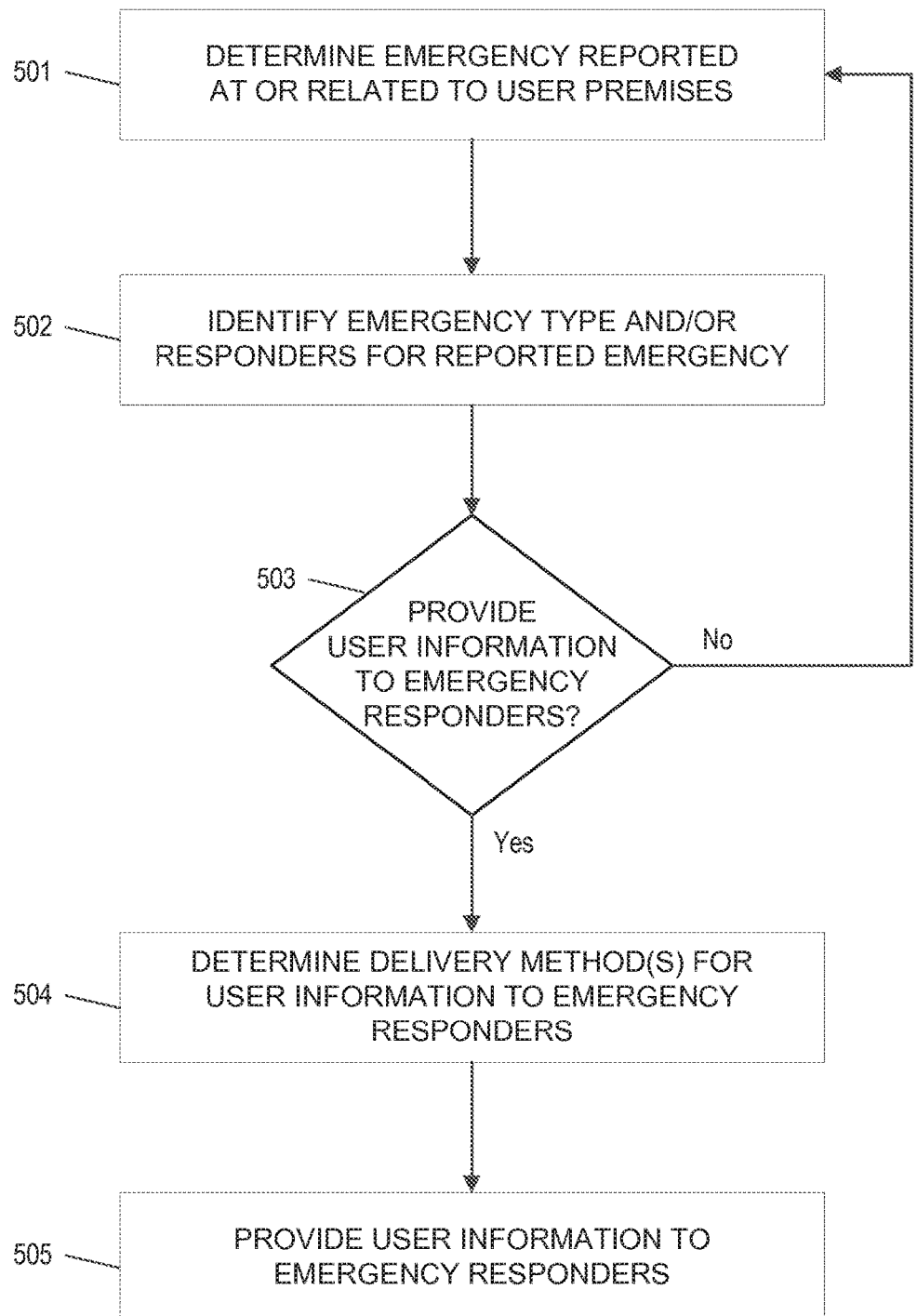
FIG. 5 illustrates an example process in accordance with various features described herein.

FIG. 5 is a flow diagram illustrating an example process of delivering appropriate user information to various emergency responders after determining that an emergency has been reported. The steps, features, and examples discussed in connection with FIG. 3 may be performed by one or more computing devices in a communication system, such as communication network 100. As discussed below, FIG. 5 relates to retrieving and delivering certain user information to on-route emergency responders in response to an emergency affecting the user and/or the user's premises 102a. In some examples, the steps and features of FIG. 5 may be performed by one or more devices entirely within a user's premises 102a, such as the user's network interface devices 120, set top box 113, personal computer 114, and/or wireless devices 116. For instance, user information may be stored on and transmitted by a user's WiFi router (or a memory associated with the WiFi router) or personal computer 114 in response to an emergency condition detected by the user's WiFi router or other devices in the user's home. In other examples, the steps and features of FIG. 5 may be performed by a combination of devices inside and outside of a user's premises 102a.

In step 501, one or more computing devices may determine that an emergency was reported at a user's premises 102a, or related to the user premises but reported from a remote location. The reported emergency may correspond to a 911 call placed by the user via a landline telephone 117 or mobile phone 116. The reported emergency also may correspond to an activation of a smoke detector, an activation of security system alarm, or a distress call input by a user into a security system at the user's premises 102a. In other examples, users may report emergencies using a set top box 113, by email from a personal computer 114 or laptop computer 115, by a text message from a mobile device 116, or other techniques. Although step 501 refers to emergencies reported at a user's premises, in other examples the emergencies identified in step 501 may include emergencies affecting the user that occur away from the user's premises, such as 911 calls or other emergency communications reported via a user's mobile device 116 (e.g., smartphone or tablet computer) while the user is not at home.

As discussed below, the determination of a reported emergency in step 501 may be performed by a user communication device in the user's premises 102a (e.g., set top box 113, personal computer 114, mobile device 116, landline telephone 117, a smoke detector, security system, etc.), a network device in the user's premises 102a (e.g., WiFi router, a modem 111, or gateway 112), and/or various devices outside of the user's premises 102a (e.g., a mobile device 116, an application server 107 of a network provider, a server of an emergency responder, or a third-party system). In some examples, a WiFi router or other network components may be configured to identify different types of emergency communications initiated by any of the devices within the user's premises 102a, as these communications pass through the network interface 120 between the communication devices in the user's premises 102a onto the communication network 100. For instance, a WiFi router or gateway 111 may be configured to identify 911 calls made from landline phones 117 or mobile phones 116 within the premises 102a, alarm system activations and user distress calls within the premises 102a, and other emergency communications sent by a user via set top box 113, personal computers 114, and other communication devices or systems in the user's premises 102a. For example, deep packet inspection or similar or other type of data analyses can be performed to identify emergency communication information. In other cases, rather than a network device 120 identifying emergency communications, one or more of the individual devices (e.g., 113-117) in the premises 102a may detect an outgoing emergency communication initiated by a user (step 501), and then may transmit a separate signal indicating the outgoing emergency communication to a computing device within the network interface 120, a local office 103 of a network provider, and/or a server of an emergency provider or other external server.

In other examples, the determination of a reported emergency in step 501 may be performed by a server of a network provider configured to identify various emergency communications initiated from any premises 102 to which the network provider 103 is connected. For example, application server 107 may execute an application to detect 911 calls, activations of security systems and fire detection systems, and other emergency transmissions from users in premises 102. Additionally, the determination of a reported emergency in step 501 may be performed by a server of an emergency responder, such as emergency services dispatch server, police or fire department server, or another third-party server configured to receive and identify emergency communications from users.

In step 502, after determining that an emergency has been reported in step 501, one or more computing devices may be used to identify an emergency type and/or a type of emergency responders (e.g., firefighters, law enforcement officers, and/or paramedics) that may be dispatched to the emergency location. In some cases, the type of emergency and/or the type of the emergency responders may be determined based on the type or nature of the emergency communication. For example, if the communication reporting the emergency is the activation of a smoke alarm or fire detection system, then the type of emergency (e.g., a potential fire) and the type of responders to be dispatched (e.g., firefighters) may be determined based on the nature of the emergency communication and location of the nearest responder unit. In other examples, if the emergency identified in step 501 is the activation of an intruder alarm of a security system, then an automatic determination may identify law enforcement officers as the appropriate the emergency responders, and if the emergency identified in step 501 is the activation of a personal emergency medical response system of an elderly or infirm user, then an automatic determination may identify paramedics as the appropriate the emergency responders, and so on.

In other examples, the type of emergency and/or the type of the emergency responders that may be dispatched might not be determined from type the emergency communication only. For example, the detection of a 911 call or other general emergency communications may be initiated by users in response to fires, break-ins and home disturbances, gas leaks, floods, medical emergencies, and other various types of emergencies.

In the case of 911 calls or other general emergency communications, the types of emergencies and/or emergency responders may be determined using various techniques. In some cases, the user may identify the type of emergency and/or type of emergency with a separate action or separate communication. For instance, during or after a 911 call, the user may press a button on his/her phone to indicate a type of emergency or type of emergency responder to be dispatched. The user also may initiate a follow up communication such as an email, text message, etc., by phone, set top box, etc., or any other computing device, to identify the type of emergency or type of emergency responders to be dispatched. In other cases, a recipient of the user's emergency communication may identify the emergency type and emergency responders in step 502. For example, after communicating with the user, a 911 operator or other emergency services dispatcher may classify the emergency type and direct the appropriate response personnel to the emergency location. During or after this process, the operator/dispatcher (or other recipient) may initiate a communication to the computing device(s) responsible for providing the user's information to the emergency responders, such as the user's WiFi router or other network interface device 120, the user's personal computer 114, the user's mobile phone 116, an application server 107 of a network provider, or any other device configured to provide information to on-route emergency responders (discussed below in steps 504-505).

The emergency type(s) and/or the type(s) of emergency responders that may be dispatched to an emergency also may be determined in step 502 by one or more automated processes operating at the user's premises 102a, a network provider office 103, or other external system. For example, speech recognition and analysis software executing on the user's personal computer 114, network interface 120, or on an external application server 107 may be configured to identify a 911 call or other general emergency communication (e.g., emergency emails, text messages), and then may parse and analyze the voice or text communication to identify an emergency type and the type of emergency responders that may be dispatched to the emergency location.

In step 503, one or more computing devices at the user's premises 102a, network provider office 103, emergency services provider, and/or other external system, may compare the type of emergency and other emergency characteristics to the previously stored user settings for delivering information to emergency responders, and based on the comparison(s), may determine whether or not various user information should be delivered to emergency responders. As discussed above in step 302, and illustrated in FIGS. 4A and 4B, users may designate specific types and/or pieces of information to be provided to various emergency responders in various different emergency situations. Thus, the determination in step 503 may include accessing the user's previous designations for providing emergency information, and comparing those designations to the type and/or characteristics of the emergency reported in step 501. If an emergency reported in step 501 is the activation of a security system at the user's premises, and if the user has designated (in step 302, for example) that no confidential information should be delivered to law enforcement officers and/or in response to a security system activation, then it may be determined in step 503 that no user information should be provided to emergency responders (503:No). As another example, if the reported emergency is a medical emergency for a household member, and if the user has designated that the member's confidential medical information should be delivered to paramedics and/or other emergency responders in the event of a medical emergency, then it may be determined in step 503 that user information should be provided (503:Yes).

Multiple determinations may be performed in step 503 in response to a single emergency. In some cases, different information may be provided to different types of emergency responders for different types of emergencies. For example, if the emergency reported in step 501 may require responses by different types of emergency responders (e.g., law enforcement officers and firefighters), then multiple determinations may be executed in step 503 to determine that confidential user information may be provided to one set of emergency responders but not the other, or that different types of confidential user information may be provided to the different emergency responders.

After determining that user information should be delivered to one or more emergency responders (503:Yes), the method(s) and technique(s) for delivering the emergency information may be determined in step 504. As discussed above in reference to step 303, users may set configurable options for providing their confidential or non-confidential information to various emergency responders. For example, users at premises 102a, network administrators, emergency services providers, and/or other users may determine whether a user's information will be transmitted directly to emergency responders (e.g., on-route responders and/or dispatchers), or whether only certain access credentials and related information will be transmitted to allow the emergency responders to connect to one or more computing devices at the user's premises 102a and retrieve the user's information. In some cases, emergency responders also may have delivery preferences for receiving a user's emergency information. For instance, if a user indicated in step 303 that only access credentials should be transmitted to on-route emergency responders, then the user and/or the emergency responders may have further preferences regarding the types of access credentials provided (e.g., a WiFi network name and password to a primary or secondary wireless network on a premises 102a, NFC credentials, or Bluetooth credentials, etc.) and the devices that the emergency responders may connect to using the access credentials (e.g., the user's WiFi router, PC 114, mobile device 116, etc.). For instance, an emergency responder may request the type of access credentials and/or host devices that are compatible with the software or hardware on emergency responder's mobile device.

After determining that user information should be delivered to one or more emergency responders (step 503), and determine the delivery methods and preferences (step 504), the appropriate information may be delivered in step 505. As discussed above, the delivery of confidential and/or non-confidential user information may include transmitting the actual user information, or alternatively may include transmitting access credentials to allow the emergency responders to connect to one or more devices and retrieve the user information after arriving at the user's premises 102a. Thus, the delivery of user information in step 505 may include transmitting the actual user information and/or access credentials to emergency dispatchers, on-route emergency responders, or an emergency services computing system. In some cases, user information and/or access credentials may be transmitted by a WiFi router or other network device 120, set top box 113, personal computer 114, mobile device 116, or other computing device at the user's premises 102a, via a communication network 100 and/or network office 103, to an emergency services system such as a dispatcher or mobile devices of on-route emergency responders. The destination network addresses for such communications may be pre-programmed into the user's home or mobile computing devices (e.g., network addresses or phone numbers of police services, fire services, paramedic services, or other emergency dispatch services), or may be received by the user's home or mobile computing devices only after the emergency is reported, for example, a phone number or network address of an on-route emergency responder may be transmitted from an emergency dispatch server, alarm company server, or the like, to a user's computing device. In other cases, if the user's information was previously stored on a device outside of the user's premises 102a, such as an application server 107 or server of an emergency services provider, then the delivery of the user information in step 505 may be performed by these external devices and need not include any action by any computing device within the user's premise 102a.

Figure 6:
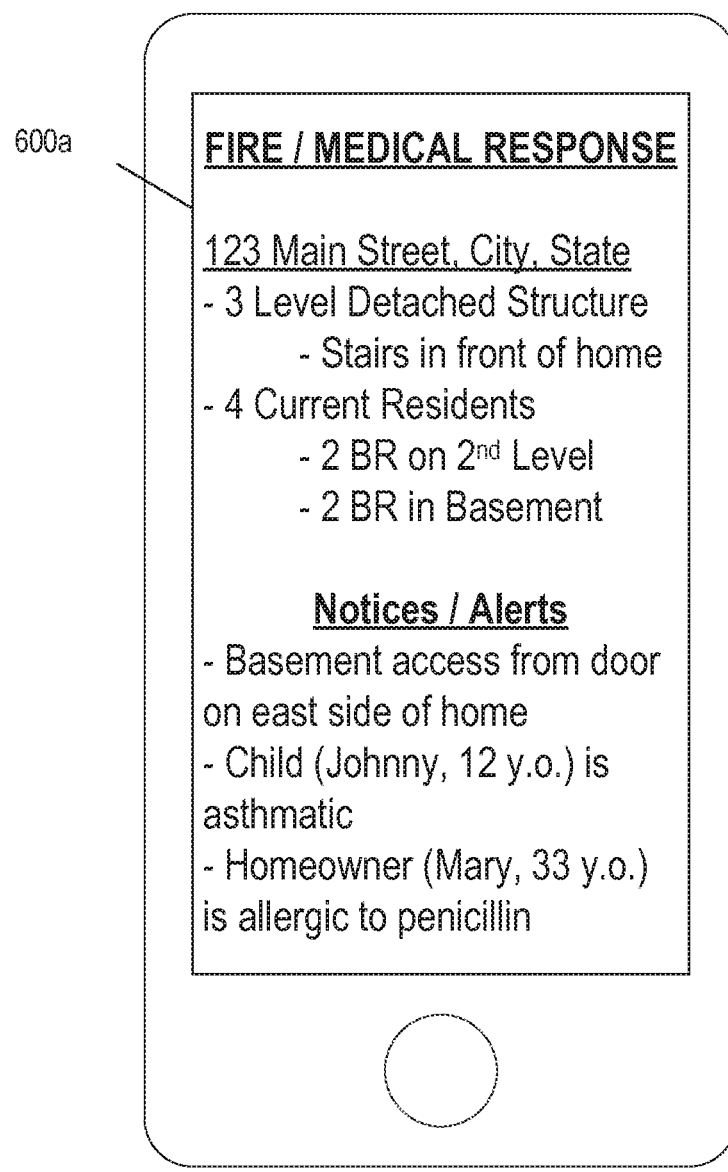
FIG. 6 is an example user interface for delivery of user information to emergency responders in accordance with various features described herein.

Referring now to FIG. 6, an example user interface is shown displaying user information on an emergency responder device. In this example, a display screen 600a may correspond to a mobile device (e.g., mobile phone, tablet computer, etc.) of an emergency services dispatcher or on-route emergency provider, such as a firefighter, paramedic, or other emergency responder. In this case, fire and medical emergency responders have been dispatched to a user's home, and the information provided to the responders includes the address, a description of the user's home including locations of the stairs and bedrooms, basement access information, and medical information about the current residents of the home. As discussed above, different types of user information may be provided for different types of emergencies and/or to different types of emergency responders. For instance, if the emergency in this example was a home break-in or an in-progress violent crime, the law enforcement officers responding to the emergency may be provided a different set of information, such as the criminal histories of the current residents, information about previous break-ins or crimes occurring at the address, and the presence of dogs, firearms, or other potential threats at the address.

When access credentials are transmitted to the mobile device of an emergency responder in step 505, rather than transmitting the user information itself, additional steps may be performed to configure devices on the user's premises 102a to securely provide the user information to the emergency responders upon arrival. For example, if the network credentials (e.g., wireless network name and password) for the user's home WiFi network are transmitted, then the user's WiFi router, personal computer 114, or other device may be configured to confirm that the user's information will be accessible upon connection to the network. When an emergency responder arrives at the user's premises 102a, a secure wireless connection may be established between a wireless access point of the user's wireless network (e.g., a WiFi router) and a mobile device of an emergency responder, to allow the emergency responder to login to the user's wireless network and to retrieve the user's information. As discussed above, a user may designate certain types of confidential and non-confidential information for different types of emergency response personnel. Thus, in some examples, after logging in to the user's wireless network, the emergency responder's mobile device may transmit information to the user's WiFi router or other device on the user's premises 102a identifying the type of emergency response personnel (e.g., law enforcement officers, firefighters, paramedics, etc.) to the user's wireless network. The emergency responder's mobile device may then request the user information that has been previously designated for that type of emergency responder.

In other cases, the user's delivery options and preferences (designated in step 303) may specify that a new set of access credentials should be created for the emergency responders (e.g., a temporary network password), or even a new temporary wireless network within the user's premises 102a, to be used by the emergency responders so that the user's primary WiFi network credentials may remain confidential. In such cases, step 505 may include creating a new temporary password and/or temporary wireless network within the WiFi router or other devices of the user's network interface 120, and then securely transmitting the newly-created network credentials to the emergency responders.

When creating a new temporary WiFi network password, or establishing a new temporary WiFi network, in step 505, the user's network infrastructure 120 also may be configured to disable or remove the temporary password or network after it has been accessed by the emergency responders. Temporary passwords and/or temporary wireless networks may be configured to support a predetermined and limited number of network access attempts or connections, (e.g., 1, 2, 3, . . . , 10, etc.), or may be configured to remain active for a predetermined period of time (e.g., 1 hour, 2 hours, . . . , 12 hours, 24 hours, etc.) after being established or after the delivery of user information to a mobile device of an emergency responder. In some cases, an established set of wireless network access credentials or other security information may be periodically expired by a wireless access point (e.g., WiFi router) or other network device, and may be replaced with new wireless network access credentials or other security information.

When using other communication techniques, rather than WiFi connections to wireless networks, different types of access credential and other information may be transmitted in step 505 depending on the communication techniques used. For example, to allow emergency responders to retrieve user information via a near-field communication (NFC) tag, the location of the NFC tag within the user's premises 102a and/or a password to the NFC tag may be transmitted in step 505. The location of an NFC tag may correspond to a user device (e.g., laptop 115 or mobile phone 116) having an installed NFC chip. In other examples, a user may have one or more NFC tags installed at fixed locations in the user's premises (e.g., near the front door to provide home information, outside of individual bedrooms to provider individual medical data, etc.). Bluetooth information also may be provided to emergency responders in certain embodiments. Such Bluetooth information may include the names and locations of the Bluetooth device(s) at the user's premises 102a that are configured to provide the user information to emergency responders, such as the user's set top box 113, personal computer 114, laptop computer 115, and/or mobile device 116. A Bluetooth passkey or other authentication data also may be provided in step 505 to allow the emergency providers to securely connect to the Bluetooth device and retrieve the user's information after arriving at the user's premises 102a.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A system comprising:
a first computing device; and
a wireless access point associated with a wireless network at an emergency location associated with a user,
wherein the first computing device comprises:
one or more processors; and
memory storing instructions that, when executed by the one or more processors, cause the first computing device to:
determine that a request for emergency assistance has been initiated at the emergency location associated with the user;
determine, after determining that the request has been initiated, that the user has granted approval for delivery of emergency-related information to emergency responders via the wireless network;
generate, based on the request for the emergency assistance, wireless network security information comprising a service set identifier (SSID) for the wireless network and comprising a password for the wireless network; and
provide, to one or more emergency responder devices associated with the emergency responders, the emergency-related information, wherein the providing the emergency-related information comprises:
delivering the wireless network security information, wherein the wireless network security information is used to access the emergency-related information maintained in one or more computing devices in the wireless network.

2. The system of claim 1, wherein the instructions, when executed by the one or more processors, cause the first computing device to transmit a request to a second computing device that is different from the first computing device and that securely stores the wireless network security information.

3. The system of claim 2, wherein the request to the second computing device comprises an identification of a subset of emergency-related information securely stored by the second computing device.

4. The system of claim 1, wherein the instructions, when executed by the one or more processors, cause the first computing device to store information indicating a plurality of different emergency types, and to store, for each different emergency type, information identifying one or more items of emergency-related information to be provided to the one or more emergency responder devices in response to the request for emergency assistance.

5. The system of claim 1, wherein the instructions, when executed by the one or more processors, cause the first computing device to establish, after one or more emergency responders arrive at the emergency location, a secure wireless connection between the wireless access point and a wireless device of the one or more emergency responder devices.

6. The system of claim 5, wherein the instructions, when executed by the one or more processors, cause the first computing device to transfer, to the one or more emergency responder devices and using the secure wireless connection, medical information regarding the user.

7. The system of claim 5, wherein the instructions, when executed by the one or more processors, cause the first computing device to establish the secure wireless connection after determining that the one or more emergency responders have arrived at the emergency location within a predetermined period of time since the request for emergency assistance was initiated.

8. The system of claim 1, wherein the wireless network security information differs from wireless network security information used to access the wireless network in non-emergency situations.

9. The system of claim 1, wherein the instructions, when executed by the one or more processors, cause the first computing device to:
expire the wireless network security information after a predetermined number of network access attempts or a predetermined number of network connections; and
replace, based on an emergency type associated with the request for emergency assistance, the wireless network security information with new wireless network security information.

10. A system comprising:
a first computing device; and
a wireless access point associated with a wireless network at an emergency location for an emergency event associated with a user,
wherein the first computing device comprises:
one or more processors; and
memory storing instructions that, when executed by the one or more processors, cause the first computing device to:
determine the emergency location for the emergency event associated with the user;
determine an emergency type of the emergency event;
generate, based on the emergency event, wireless network security information comprising:
a service set identifier (SSID) for the wireless network; and
a password for the wireless network;
detect a wireless device associated with an emergency responder at the emergency location;
cause one or more computing devices storing emergency information at the emergency location to deliver the wireless network security information to the wireless device; and
cause the one or more computing devices to deliver, via the wireless network and to the wireless device, emergency information associated with the emergency type.

11. The system of claim 10, wherein the emergency information associated with the emergency type comprises information indicating different subsets of user information to be supplied to firefighters, law enforcement officers, and medical personnel.

12. The system of claim 11, wherein the different subsets of user information comprise at least one item of information common to the different subsets, and at least one item of information not common among the different subsets.

13. The system of claim 10, wherein the emergency information associated with the emergency type comprises:
   location information for one or more near field communication (NFC) tags, wherein the one or more NFC tags are located at the emergency location; and
   a password associated with each NFC tag of the one or more NFC tags.

14. The system of claim 10, wherein the instructions, when executed by the one or more processors, cause the first computing device to expire a login credential of the wireless network after determining that a predetermined period of time has passed, a predetermined number of network access attempts have been initiated, or a predetermined number of network connections have been made, since receiving the emergency information associated with the emergency type.

15. The system of claim 10, wherein the instructions, when executed by the one or more processors, cause the first computing device to:
   determine that the wireless device associated with the emergency responder has accessed the emergency information over a secure wireless connection between the wireless access point of the wireless network at the emergency location and the one or more computing devices storing the emergency information.

16. The system of claim 15, wherein the emergency information comprises a plurality of items of information corresponding to the emergency type of the emergency event, and wherein the plurality of items of information comprises information identifying different subsets of user information to be supplied to firefighters, law enforcement officers, and medical personnel.

17. The system of claim 16, wherein the different subsets comprise at least one item of information common to the different subsets, and at least one item of information not common among the different subsets.

18. A system comprising:
a first computing device; and
a wireless access point associated with a temporary emergency information wireless network at an emergency location associated with a user,
wherein the first computing device comprises:
   one or more processors; and
   memory storing instructions that, when executed by the one or more processors, cause the first computing device to:
      determine that a request for emergency assistance has been initiated at the emergency location associated with the user;
      cause, after determining that the request has been initiated, establishment of the temporary emergency information wireless network, the temporary emergency information wireless network comprising a service set identifier (SSID) and comprising a password; and
      provide, to one or more emergency responder devices, the SSID and the password to allow the one or more emergency responder devices to:
         access the temporary emergency information wireless network at the emergency location; and
         retrieve user information associated with the emergency assistance from one or more computing devices storing the user information in the temporary emergency information wireless network.

19. The system of claim 18, wherein the instructions, when executed by the one or more processors, cause the first computing device to expire the SSID and the password after determining that a predetermined period of time has passed, a predetermined number of network access attempts have been initiated, or a predetermined number of network connections have been made, since the providing of the SSID and the password.

20. The system of claim 18, wherein the instructions, when executed by the one or more processors, cause the first computing device to establish a secure wireless connection between the wireless access point associated with the temporary emergency information wireless network at the emergency location and a wireless device of the one or more emergency responder devices after one or more emergency responders arrive at the emergency location.

* * * * *

UNITED STATES PATENT AND TRADEMARK OFFICE
CERTIFICATE OF CORRECTION

PATENT NO. : 10,285,036 B2
APPLICATION NO. : 15/847160
DATED : May 7, 2019
INVENTOR(S) : William Lesage et al.

Page 1 of 1

It is certified that error appears in the above-identified patent and that said Letters Patent is hereby corrected as shown below:

In the Specification

Column 11, Detailed Description, Line 18:
Please delete "112," and insert --113--

Column 11, Detailed Description, Line 19:
Please delete "113." and insert --114.--

Column 14, Detailed Description, Line 9:
Please delete "111," and insert --110,--

Column 14, Detailed Description, Line 9:
Please delete "112)," and insert --111),--

In the Claims

Column 22, Claim 18, Line 21:
After "to:", insert --¶--

Column 22, Claim 18, Line 23:
After "and", insert --¶--

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*